United States Patent [19]

Moscowitz et al.

[11] Patent Number: 5,193,442
[45] Date of Patent: Mar. 16, 1993

[54] USE OF FLUID TO AGITATE ARTICLES

[75] Inventors: Charles M. Moscowitz; James Teng; John H. Dokos, all of St. Louis, Mo.; David E. Bishop, Dallas, Tex.

[73] Assignee: Anheuser-Busch Companies, Inc.

[21] Appl. No.: 642,036

[22] Filed: Jan. 16, 1991

[51] Int. Cl.⁵ .............................................. A47J 37/12
[52] U.S. Cl. ...................................... 99/348; 68/207; 99/353; 99/406; 99/407; 99/409; 134/172; 134/198; 366/107; 366/173
[58] Field of Search ................ 99/409, 348, 407, 355, 99/406, 405, 404, 403, 330, 353; 426/438, 519; 366/101, 107, 165, 167, 173; 134/172, 174, 198, 199; 68/207

[56] References Cited

U.S. PATENT DOCUMENTS

| | | | |
|---|---|---|---|
| 400,443 | 4/1889 | Cooper | 366/107 |
| 1,580,476 | 4/1926 | Fassio | 366/173 |
| 1,881,611 | 10/1932 | Hynes | 134/198 |
| 2,085,494 | 6/1937 | Ferry | 99/405 |
| 2,174,556 | 10/1939 | Ferry | 99/405 |
| 2,460,425 | 2/1949 | Mace | 134/198 |
| 2,570,021 | 10/1951 | Beach | 134/199 |
| 2,741,254 | 4/1956 | Trostler | 134/199 |
| 3,209,678 | 10/1965 | Benson et al. | 99/409 |
| 3,218,959 | 11/1965 | Swisher | 99/409 |
| 3,682,665 | 8/1972 | Diaz | 99/409 |
| 4,228,730 | 10/1980 | Schindler et al. | 99/407 |
| 4,357,862 | 11/1982 | Anstett et al. | 99/405 |
| 4,443,111 | 4/1984 | Minaire | 68/208 |
| 4,512,665 | 4/1985 | Cline et al. | 366/167 |
| 4,694,743 | 9/1987 | Groff | 99/403 |
| 4,706,556 | 11/1987 | Wallace et al. | 99/330 |
| 4,844,930 | 7/1989 | Mottur et al. | 426/438 |
| 4,867,049 | 9/1989 | Johnson | 99/330 |
| 4,913,042 | 4/1990 | Miller | 99/406 |
| 4,977,821 | 12/1990 | Benson et al. | 99/409 |
| 5,009,150 | 4/1991 | Andersen | 366/107 |
| 5,112,633 | 5/1992 | Benson et al. | 426/438 |

FOREIGN PATENT DOCUMENTS

| | | | |
|---|---|---|---|
| 562618 | 9/1958 | Canada | 366/173 |
| 57293 | 11/1936 | Norway | 99/406 |

OTHER PUBLICATIONS

Advertisement in Snack Food magazine, Jan. 1991, by Heat and Control; caption is "I Used To Stir A Kettle Of Chips. Now I Do Ten At Once!" Videotape of Reference AR in operation.

Primary Examiner—Timothy F. Simone
Attorney, Agent, or Firm—Richards, Medlock & Andrews

[57] ABSTRACT

An apparatus for dispensing and agitating objects to be treated in a liquid is described in terms of the use of the apparatus in the processing of potato chips in cooking oil. The apparatus comprises an automated kettle rake (100) for use in the processing of potato chips or other objects (101) in a kettle (102) filled with cooking oil or other desired liquid (103), involving an agitation manifold (104) movably mounted above the kettle (102) and a dispersal manifold (106) positioned inside the kettle (102). The agitation manifold (104) disperses the chips or other objects by injecting fluid through at least one nozzle onto the liquid in the kettle (102) while passing over the length of the kettle (102). Optionally, the cooked chips or other objects may be swept onto a removal conveyor (110) after processing is completed.

20 Claims, 5 Drawing Sheets

USE OF FLUID TO AGITATE ARTICLES

FIELD OF THE INVENTION

The present invention relates to a method and apparatus for using fluid to agitate articles. In one aspect, the invention relates to batch processing objects in a liquid. In a specific aspect, the invention utilizes fluid jets to disperse and agitate snack food objects in a liquid within a kettle.

BACKGROUND OF THE INVENTION

A common process step in the production of many snack foods is the introduction of a plurality of individual "bite size" pieces of uncooked or partially cooked food material into a container of hot oil for frying. As the food pieces are introduced into the hot oil, it is generally desirable to disperse the pieces within the oil to provide for efficient utilization of the body of hot oil and to prevent the pieces sticking to each other. After the initial dispersal of the pieces in the hot oil, it is desirable that the pieces be further agitated so that the pieces do not stick to each other and so that they cook more uniformly. When the material is a snack food in hot oil, the pieces will generally not cook properly unless all surfaces are periodically submerged or turned "face-down" into the oil. Previously, this was generally accomplished using manual agitation of the pieces in the oil, for example, by an operator using a device such as a stainless steel rake shaped similar to an ordinary leaf rake.

Batch processing of food items is characterized by a temperature cycle which affects the quality and uniformity of the food product. The temperature cycle for the production of potato chips is representative of batch processing of food items. One of the problems with the prior manual agitation method is that the temperature cycle could not be controlled as well as desired. In a typical process a burner is utilized to apply a heat input to the oil. When the processing liquid, typically a cooking oil, reaches a predefined temperature, the food material, such as raw potato slices, is added to the cooking oil. Upon the addition of the potato slices to the cooking oil, the oil temperature drops as the water in the potato slices is boiled off. As the cycle continues, the rate of water removal from the potato slices decreases, the oil temperature ceases to fall and begins to rise again. At a predetermined point in the cycle, or when the oil temperature reaches a predetermined value, the batch process is completed, the chips having been cooked the proper amount. The chips are then removed from the hot oil and a new batch cycle can be started. However, as the chips are removed at the end of a cycle, the oil temperature rises. If the amount of time taken to remove the cooked chips and to prepare for a new cycle is not precisely uniform, the starting temperature of each batch may not be uniform. A nonuniform start temperature can lead to nonuniform product. Severe variations in start temperature can lead to unusable product. In the extreme case, if the operator is not prepared to start the batch at the right point, the oil temperature can exceed a predetermined value and the system will automatically shut off for safety reasons. In this event, a batch of material must be run to reduce the oil temperature and that batch of material will not be usable.

The manual method of raking the food items is unsatisfactory for several reasons. First, it leads to less uniform product because the operator is unable to stir or agitate the objects as repeatably as a mechanical device. Second, the operator is responsible for monitoring the process temperature as well as agitating the pieces. The operator may not uniformly stir the batch while monitoring the temperature. Third, the product may be wasted by being flung out of the batch by excessive manual agitation. Fourth, some snack foods, such as potato chips, produce a water vapor cloud over the oil as water is removed from the raw or partially cooked potato slices. The cloud of water vapor makes it difficult for the operator to see the slices, which hinders the operator's ability to uniformly agitate the batch. Last, the cloud of water vapor is hot and unpleasant for the operator to work in, making it more difficult to uniformly perform the job early in the batch process cycle.

A recently offered automatic device uses a drum and metal paddles for agitation and an air blast for dispersal. This device is essentially an automated version of an operator with a rake. It succeeds in reducing manpower but is mechanically complex. The drum and paddle system is subject to fouling with the food material and is difficult to keep clean. Its mechanical complexity potentially creates new maintenance problems.

Therefore, a need exists for a simplified automated kettle rake which reduces the need for manual labor. Such a device must be capable of circulating raw or uncooked food material which either floats on the surface or sinks to the bottom of the container filled with a liquid. The device must also be capable of circulating and dispersing the food pieces. Moreover, such a device should be able to automatically remove the food pieces after they have been cooked.

SUMMARY OF THE INVENTION

The present invention achieves the dispersal and agitation of pieces suspended in a liquid contained in a container, such as potato chips, in a kettle of cooking oil, by use of at least one directed fluid stream. Each fluid stream can enter the container through a nozzle in a dispersal manifold or an agitation manifold.

In one embodiment, the dispersal manifold is placed within the body of process oil in the kettle. The dispersal manifold contains at least one hole or nozzle. Pressurized oil is injected through these holes in the dispersal manifold, causing circulation of the process oil. It is not necessary for the one or more holes to be circular, a single slit would also be in accordance with the invention.

The invention works best if the liquid injection through the dispersal manifold begins prior to the introduction of the pieces into the process oil. This allows the liquid flow within the container to begin prior to the pieces being placed within the process oil. The resulting circulation causes the pieces introduced into the container to disperse from the introduction area and move into the rest of the oil volume of the container. In a typical application, the dispersal manifold can be a linear array of nozzles located on one side of the kettle. This position causes a circular motion of the liquid in the container during the dispersal phase of the process.

When all the pieces for a particular batch have been introduced into the container and, if necessary, the piece introduction device has been moved out of the way, the liquid flow to the dispersal manifold can be discontinued. Liquid flow then starts through an agitation manifold, which can be positioned above the process oil. However, it would be in accordance with the invention to have liquid flow through both manifolds simultaneously. The purpose of the agitation manifold is to prevent agglomeration of the pieces during processing and to rotate the individual pieces about one of their axes to ensure uniform treatment on all surfaces of the individual pieces. The agitation manifold functions by sending substantially downwardly directed streams of liquid into the body of process oil in the container while moving back and forth across the open top of the container. The substantially downwardly directed streams strike individual pieces off center, causing the pieces being processed to rotate about at least one of their axes and to be moved so that they do not stick to each other. In a preferred embodiment, the downwardly directed streams are canted about 5° from the vertical outwardly from the center of the manifold to provide a cleansing downwash of the container wall at each end of the movement cycle.

During processing, the agitation manifold is moved across the open top of the container, pausing at each end of the movement cycle to wash the pieces into the process liquid, agitating the entire contents of the bath. In order to prolong the useable life of the process liquid, the agitation manifold may be operated at a high pressure and a high flow rate for a portion of the cycle and a lower pressure and a lower flow rate during the remainder of the cycle. When the process liquid is a cooking oil, higher pressures and flow rates lead to more rapid degradation via oxidation of the oil.

When the process cycle is complete, the pieces are removed from the container and the cycle is repeated. If necessary to remove the product, the rotation manifold can be elevated out of the way of any product removal mechanism.

Accordingly, it is an object of the invention to eliminate the manual use of a rake or similar device to disperse items in a container of liquid. Another object of the invention is to maintain the dispersion of the objects being processed and to rotate the objects about one of their axes to insure uniform processing. Another object of the invention is to provide uniform cooking of food pieces in a cooking oil without requiring manual stirring of the pieces in the oil.

BRIEF DESCRIPTION OF THE DRAWINGS

For a more complete understanding of the present invention, and for further advantages thereof, reference is now made to the following Detailed Description taken in conjunction with the accompany drawings, in which.

DETAILED DESCRIPTION

Figure 1:
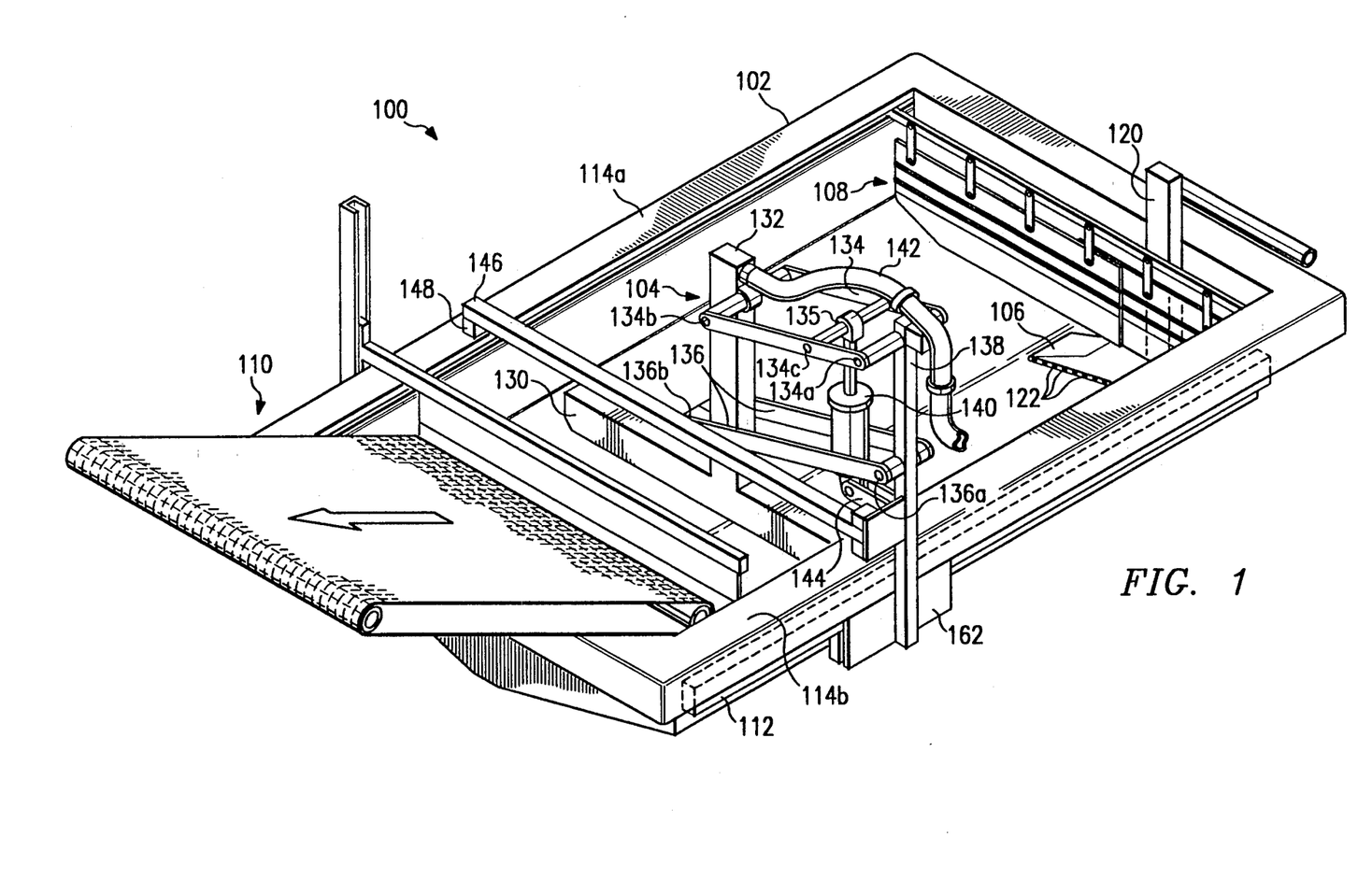
FIG. 1 is a perspective view of a kettle having an automated fluidic kettle rake embodying the present invention.

Referring to FIG. 1, an automated kettle rake 100 embodying the present invention is shown attached to a product kettle 102. The automated kettle rake 100 is comprised of several elements including an agitation manifold 104, dispersal manifold 106, product sweep 108, and output conveyor 110.

Kettle 102 is typical in the art and can be generally rectangular with a shallow V-shaped sloped bottom 116. A drain hole 118 (FIG. 4) typically penetrates kettle bottom 116. Carriage rail 112 runs horizontally along one side of kettle 102. Side flange portions 114a, 114b extend horizontally from the sides of kettle 102 and create suitable mounting platforms for additional equipment. During processing, cooking oil is introduced into the kettle 102, creating a pool or body of process oil approximately three to four inches deep. However, the invention is applicable to liquid baths of any suitable depth.

Dispersal manifold 106 is shown mounted near the bottom 116 of kettle 102. This manifold 106 is operatively attached to a pressurized supply of cooking oil by liquid feed tube 120. In a shallow container such as an oil kettle for cooking potato chips, the dispersal manifold would typically be placed at the bottom. However, if the liquid container is deep enough, the dispersal manifold could be placed other places within the process liquid. Also, the dispersal manifold would normally be placed to avoid a gap between the manifold and the bottom or side wall of the container, but this is not necessary. This would prevent accumulation of food product underneath the manifold, leading to sanitation problems.

Pressurized jets of oil exit the dispersal manifold 106 through a plurality of spaced openings 122. In a shallow pool, the openings 122 will generally be oriented substantially parallel to the upper surface of the oil. However, any orientation that causes the desired movement of the oil would be in accordance with the invention. Raw potato chips are dropped into the kettle 102 after it is filled with hot cooking oil. These chips typically initially sink toward the bottom 116. After some of the water contained in the chips has been removed, the chips float on the surface of the oil. The jets from openings 122 are positioned to create a whirlpool effect in the cooking oil, providing for the initial dispersal of the potato slices, and also inhibiting the clumping together of the slices. As the slices cook, they become more buoyant and float to the surface of the oil. The flow rate of oil through the holes 122 in the manifold 106 should be sufficiently great to accomplish the initial dispersal of the slices. In one particular embodiment, the total flow rate through the dispersal manifold having a total of thirteen (13) nozzles, each being 5/32" in diameter, is approximately fifty (50) gallons per minute for approximately thirty (30) seconds in a kettle containing approximately two hundred (200) gallons of oil.

The agitation manifold or rake mechanism 104 comprises a rake 130 which is suspended from central support 132. Central support 132 is pivotally attached at points 134a, 134b, 136a, and 136b to upright member 138 by a pair of upper supports 134 and a pair of lower supports 136, forming a vertical parallelogram. The upright member 138 is rigidly attached to carriage 162 and the horizontally extending rake stabilizer arm 146. A pneumatic cylinder 140 is attached between a pneumatic cylinder support arm 144 and arm 135 which extends between upper support arms 134. Arm 135 is attached to upper supports 134 at points 134c. The support arm 144 extends horizontally from upright member 138. This pneumatic cylinder 140 allows the central support 132 to be vertically raised and lowered while being maintained parallel to the upright member 138.

This is accomplished when a pneumatic air control valve permits air pressure to be applied to pneumatic cylinder 140 to extend or retract its piston arm. The rake 130 is thus raised or lowered relative to the surface of the cooking oil in the kettle 102.

The rake mechanism 104 is driven back and forth over the length of the kettle 102 by carriage 162 moving along the length of carriage rail 112. Rake stabilizer arm 146 is thus also driven with the rake. The block 148 is mounted on the underside of rake stabilizer arm 146 and engages the kettle side portion 114a. Block 148 is typically made of a lubricating material such as polytetrafluoroethylene. In a typical cooking cycle, the rake mechanism makes round trips across kettle 102, with each trip lasting approximately 24 seconds. A round trip consists of a pass from one end of the container to the other lasting ten (10) seconds, a two-second pause, a ten-second return pass, and another two-second pause. Any suitable rate of movement of the agitation manifold is in accordance with the invention. It is generally desirable that the rate of movement be fast enough to at least substantially prevent product bunching.

During each trip, oil is injected through spaced apart holes 131 in rake 130 onto the surface of the body of oil below. In a preferred embodiment, the agitation manifold contains two rows of fourteen (14) nozzles spaced on four-inch centers for a total of 28 nozzles. Each nozzle has a diameter of 3/16". Cooking oil is initially injected through each nozzle 131 at a high flow rate, e.g., at an individual flow rate of about 2.9 gpm for a total flow rate of seventy (70) gpm, followed by injection at low, e.g., at an individual flow rate of about 2 gpm for a total flow rate of fifty (50) gpm. However, the use of a single flow rate, either high or low, would be in accordance with the invention.

Dam 171 blocks the premature flow of chips to take-off conveyor 110. Rake mechanism 104 travels back and forth between a point adjacent the dispersal manifold 106 and a point adjacent dam 171. After the cooking cycle is complete, both the rake mechanism 104 and the dam 171 are raised. This allows the sweep 108 to pass across the surface of oil, pushing all floating objects toward conveyor 110. The sweep 108 is a horizontally segmented device with typically three segments. Each segment is hingedly secured to its adjacent segment.

Figure 2:
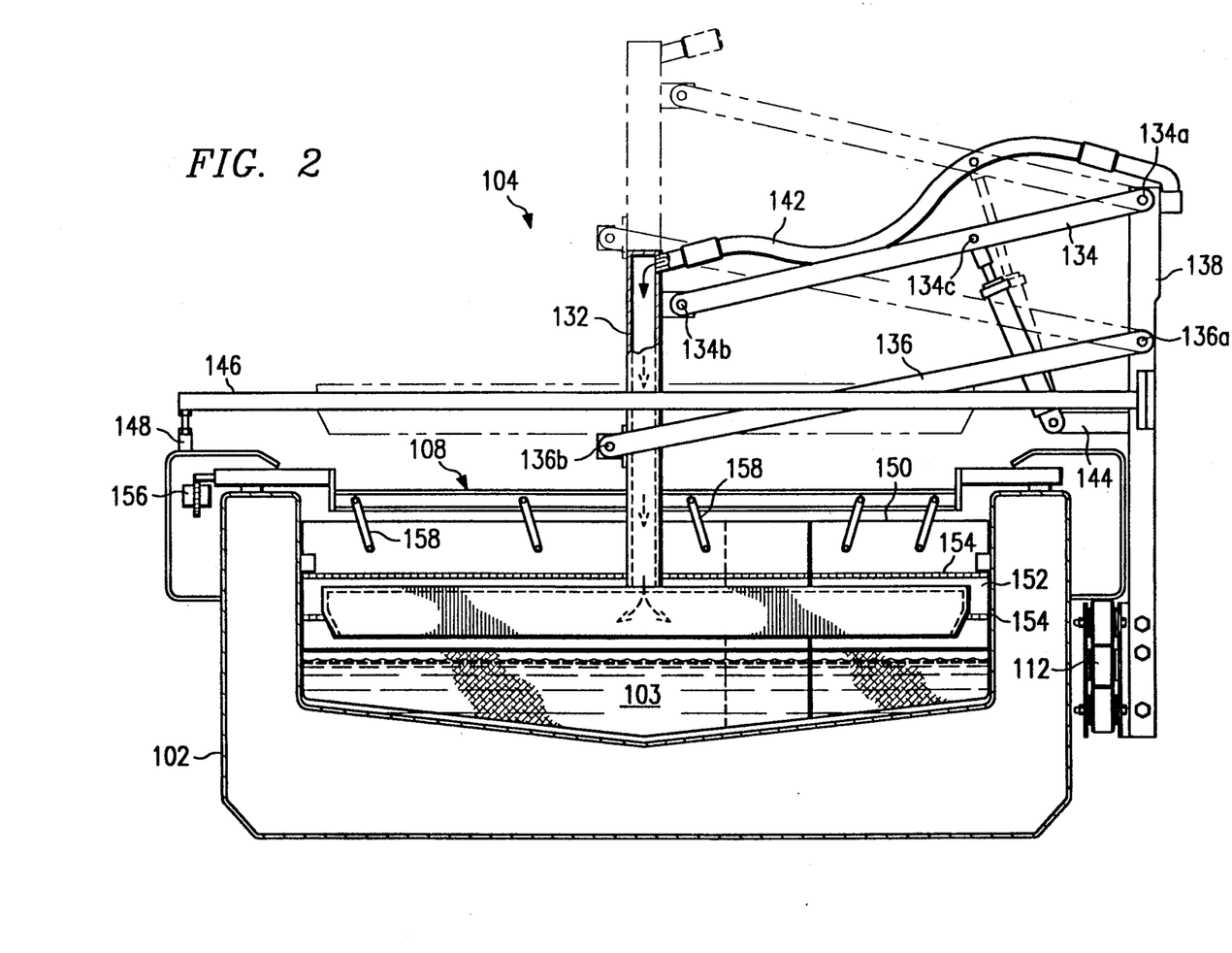
FIG. 2 is a sectional view across the width of the kettle and rake mechanism.

FIG. 2 provides a sectional view across the width of kettle 102 and automated kettle rake 100. Again, the side kettle portions 114a, 114b are illustrated as they relate to rake stabilizer arm 146 and sweep carrier arms. Cooking oil is injected through flexible tube 142 into central support 132 which contains a fluid passage leading to holes 131 in rake 130. Rake liquid feed tube 142 is operatively connected to a supply of pressurized cooking oil.

After the cooking cycle is complete the central support 132 is raised to the position shown in dashed lines. At this point, sweep 108 is actuated. The sweep 108 begins at the end adjacent the dispersal manifold and proceeds toward the dam 171 adjacent the conveyor 110. The inlet end of conveyor 110 is at least partially submerged in the oil. The dam 171 is raised and the sweep 108 pushes the cooked chips toward and onto the conveyor 110.

Sweep 108 is comprised of sweep plates 150 attached by sweep attachment fingers 158. Sweep plates 150 are comprised of baffles 152 connected with hinges 154. Sweep 108 is driven the length of kettle 100 by a drive mechanism (not shown) attached to sweep 108 at sweep drive attachment point 156.

Figure 3:
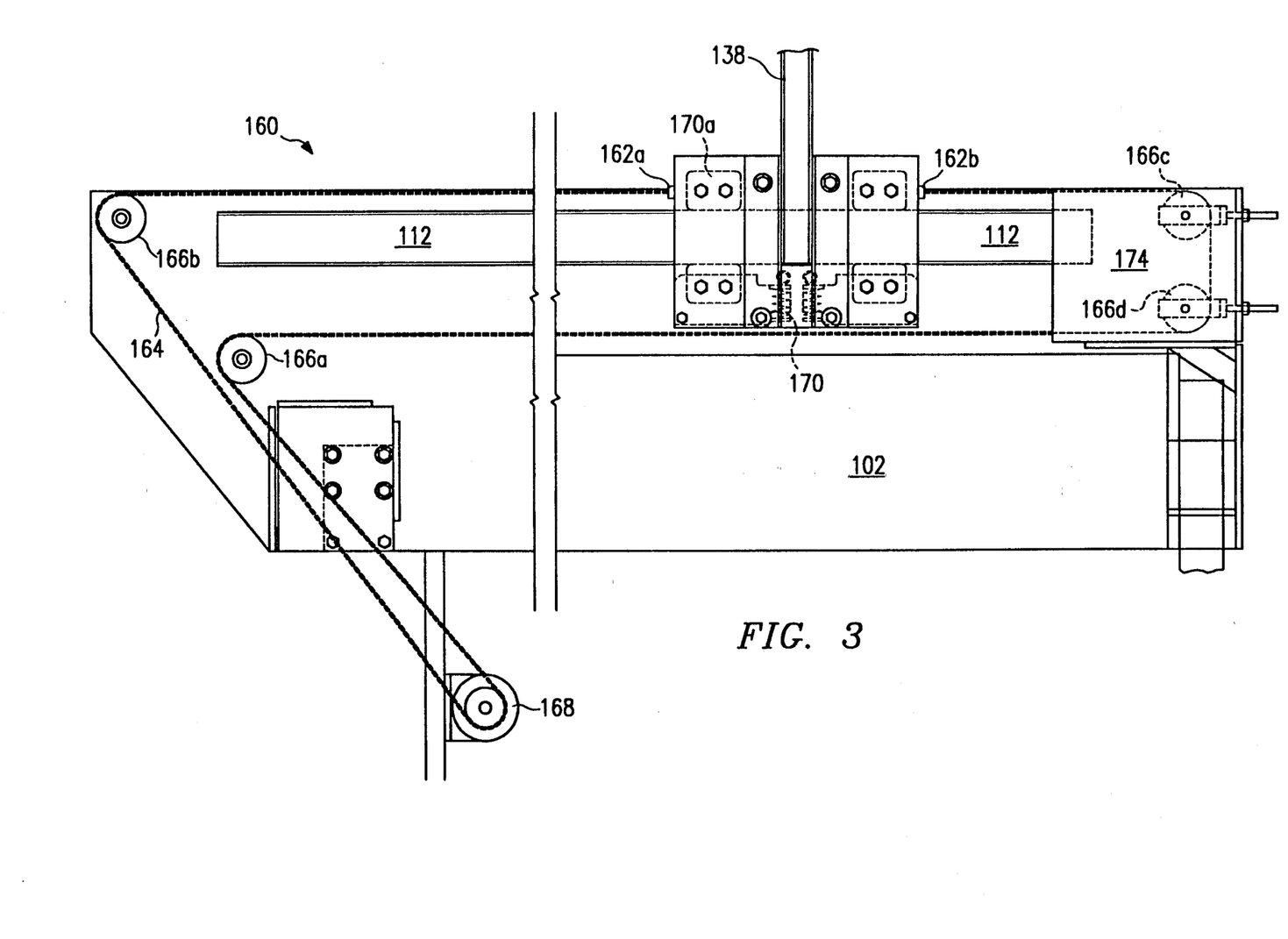
FIG. 3 is a side view of the automated kettle rake showing the rake drive.

FIG. 3 illustrates the carriage system 160 in greater detail. Carriage 162 is slidably mounted on carriage rail 112. The carriage 162 engages the surface of rail 112 with two upper and two lower slide blocks 170a, 170b, 170c, and 170d. The blocks 170c and 170d underneath rail 112 maintain contact with the rail due to engagement spring 172. Upright 138 is rigidly connected to carriage 162.

Chain 164 is attached to the carriage 162 at points 162a and 162b. This chain 164 creates a circuit around a sprocket on motor 168 and around rotatable sprockets 166a, 166b, 166c and 166d. Reversible motor 168 pulls chain 164 clockwise a predetermined distance, hesitates, and then pulls the chain 164 counterclockwise around the sprockets a predetermined distance. This, in turn, pulls the agitation manifold 104 back and forth over kettle 102. Sprockets 166c, 166d are covered by guard plate 174.

Figure 4:
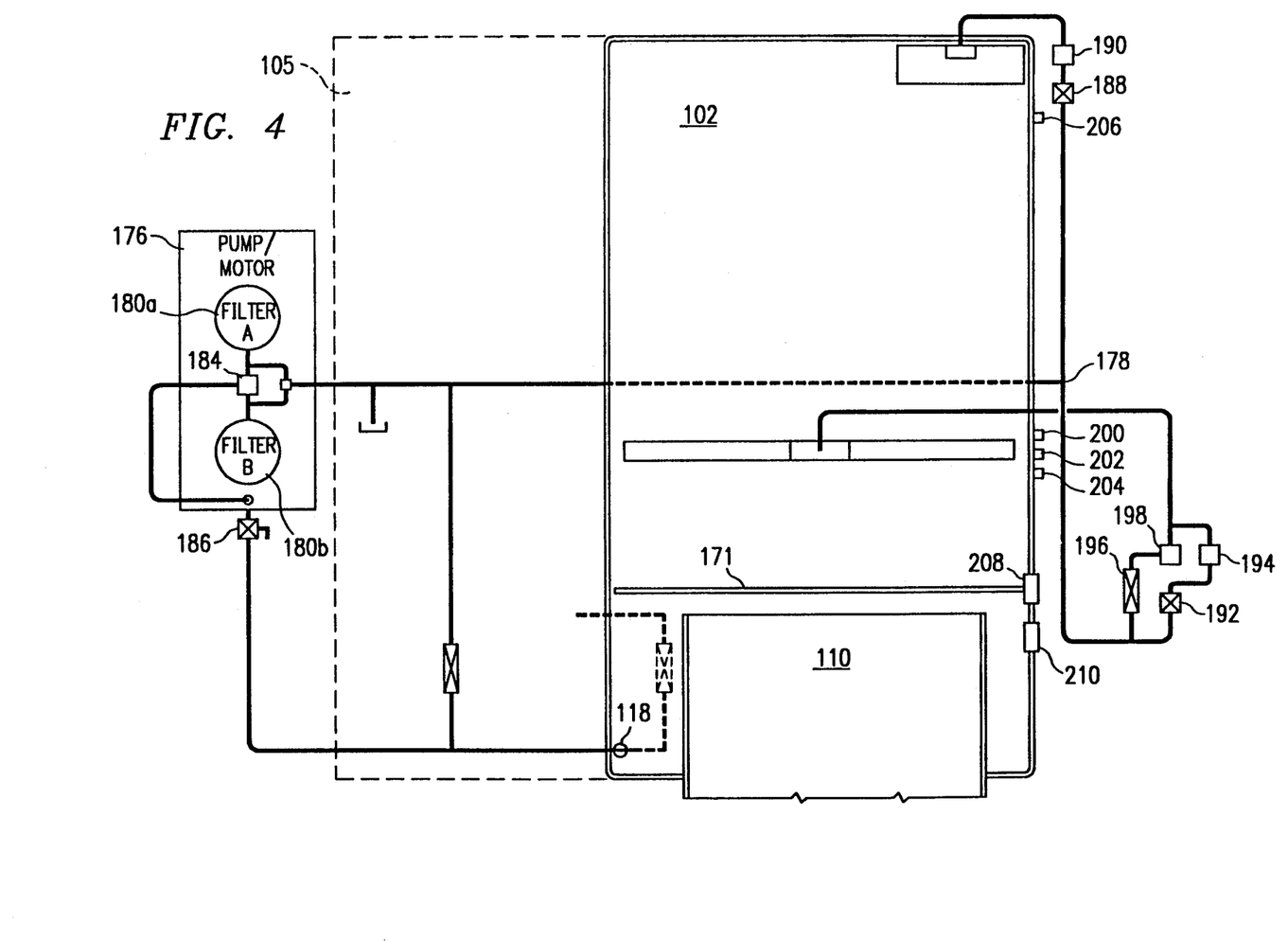
FIG. 4 is a top view of the automated kettle rake illustrating the hydraulic system layout.

FIG. 4 displays the overall layout of the kettle 102 and the hydraulic system supplying pressurized liquid to the dispersal manifold 106 and the agitation manifold 104. FIG. 4 shows kettle 102 with operator platform 105 adjacent it. Adjacent to platform 105 is liquid pump 176 and filter canisters 180a and 180b. The liquid circulation pattern begins at kettle drain 118 through liquid pump 176 then through filter 180a or 180b to the pressurized liquid supply manifold 178. Filter 180a or 180b is selected using filter selection valve 184. If needed during system maintenance, pressurized oil supply valve 186 can be actuated to its closed position. Pressurized oil manifold 178 supplies pressurized oil to dispersal manifold automatic valve 188, rake high pressure automatic valve 192 and rake low pressure automatic valve 196. When dispersal manifold automatic valve 188 is open, pressurized oil is supplied to the dispersal manifold through dispersal manifold 106 pressure control orifice 190. Pressure control orifice 190 controls the pressure of liquid entering the liquid container through the dispersal manifold 106. While the preferred embodiment uses wide open automatic control valves and pressure control orifices to control the precise pressure at each phase of the process, automatic control valves with variable output pressures can also be used.

When the product dispersal phase is complete, dispersal manifold automatic valve 188 closes and rake high pressure automatic valve 192 opens supplying pressure to the rake through rake high pressure control orifice 194. Motor 168 is actuated to move the rake back and forth across the top of the liquid container for approximately 100 seconds or eight passes, at the high pressure setting. At the end of the high pressure phase, rake high pressure automatic valve 192 closes and rake low pressure automatic valve 196 opens, supplying pressure to the rake through rake low pressure control orifice 198. The rake continues to move back and forth across the top of the liquid container throughout the remainder of the batch cycle.

Position and status information is reported by six proximity switches. "Rake home" proximity switch 200 indicates when the rake is in the home position. "Rake up" proximity switch 202 indicates when the rake has successfully been raised. "Rake down" proximity switch 204 indicates when the rake has been lowered to the operating position. "Rake at product introduction end" proximity switch 206 indicates when the rake is at the product introduction end of the liquid container.

Proximity switch 206 is used to allow the rake to dwell temporarily at the introduction end of the container in order to wash off the wall mechanism at that end. "Rake at product removal end" proximity switch 208 indicates when the rake is at the opposite end of the liquid container. Proximity switch 208 is used to allow the rake to dwell at the product removal end and wash off the face of the product retention wall. Product retention wall or dam proximity switch 210 indicates when the dam has been raised and the product may be removed from the liquid container.

Figure 5A:
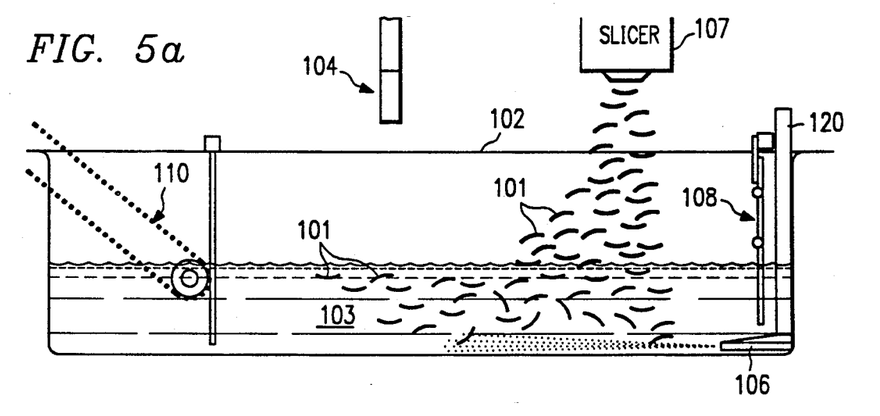
FIGS. 5a, 5b and 5c illustrate the method of cooking and removing potato chips using the automated kettle rake.
Figure 5B:
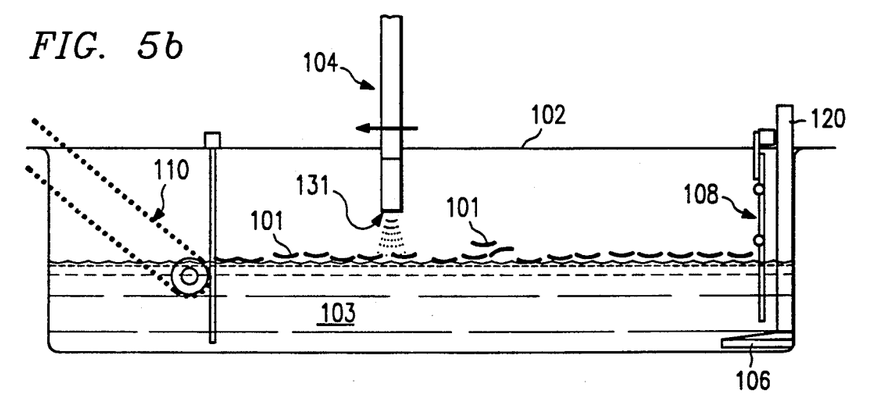
Figure 5C:
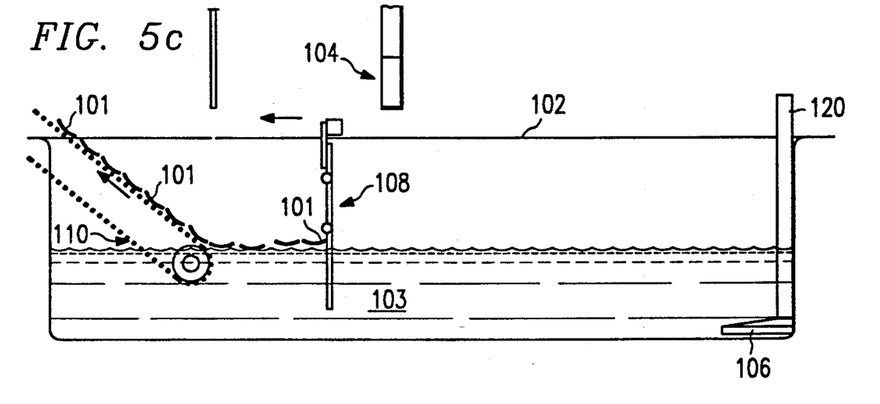

FIGS. 5a, 5b and 5c illustrate a method of producing potato chips using the automated kettle rake 100. FIG. 5a illustrates the initial steps of introducing sliced potatoes 101 into kettle 102 and dispersing same with circulation created by the dispersal manifold 106. Potato slices 101 are dropped into the kettle 102 of hot cooking oil 103 from the slicer 107. Typically, the slicing operation requires about thirty seconds. Oil is injected through the dispersal manifold 106 prior to and during the slice-in operation. Oil injection through dispersal manifold 106 ceases after the slicing operation is complete, and the slicer withdraws. During the slicing operation, the rake mechanism 104 is in a raised position. Sweep 108 is positioned above the dispersal manifold 106. FIG. 5b illustrates the automated kettle rake during the cooking process. Rake mechanism 104 is lowered to a position approximately one to two inches above the surface of oil 103. The rake mechanism 104 then passes back and forth over the oil in kettle 102 while ejecting downward streams of oil 103 onto chips 101. This agitates and rotates chips 101, thereby enhancing uniform cooking. Oil is ejected from rake mechanism 104 onto the chips 101 at high pressure during the first eight passes of the rake mechanism 104. This lasts for approximately one hundred seconds. Oil pressure is decreased after the one hundred seconds of high pressure. The rake mechanism or agitation manifold 104 continues to pass over kettle 102 until the oil 103 in kettle 102 reaches a predetermined temperature at which time the cooking cycle ends.

FIG. 5c illustrates the removal of chips 101 from kettle 102 after the cooking cycle ends. Dam 171 and agitation manifold 104 are both raised above kettle 102. Sweep 108 next sweeps across the surface of oil 103. Chips 101 are engaged by rotating conveyor 110 and are lifted out of the kettle 102.

During the processing, cooking oil is lost with the product as it is removed at the end of each process cycle. The lost amount must be made up with either fresh oil or previously used oil. Hence, while the directed streams are typically of the oil from the kettle after filtration, the liquid streams may also be a makeup quantity of fresh or used oil or a blend of such filtered oil and makeup oil. Although a preferred embodiment uses liquid as the dispersal fluid, in an appropriate case, the fluid could be a gas such as air or nitrogen.

Although preferred embodiments of the invention have been described in the foregoing Detailed Description and illustrated in the accompanying drawings, it will be understood that the invention is not limited to the embodiments disclosed, but is capable of numerous rearrangements, modifications and substitutions of parts and elements without departing from the spirit of the invention. Accordingly, the present invention is intended to encompass such rearrangements, modifications, and substitutions of parts and elements as fall within the spirit and scope of the invention.

We claim:

1. An apparatus for dispersing objects and for agitating the objects while in a body of liquid in a container, the body of liquid having an upper surface, said apparatus comprising:
    (a) at least one dispersal fluid jet to provide a dispersing fluid stream for causing motion of said objects, said at least one dispersal fluid jet being located in a dispersal manifold, said dispersal manifold being positionable with respect to said container so that said at least one dispersal fluid jet is covered by the liquid in the body of liquid in the container when said at least one dispersal fluid jet is in use, and wherein said dispersing fluid stream causes motion of the liquid in said container sufficient to move objects that have been introduced into the body of liquid away from the point of introduction of said objects into the body of liquid in the container; and
    (b) at least one agitating fluid jet to direct at least one directed stream of an agitating fluid at the objects in the body of liquid in the container with sufficient force to agitate the objects within the body liquid in the container, said at least one agitating fluid jet being part of a rake mechanism, said rake mechanism being adapted for relative movement with respect to the upper surface of the body of liquid in said container;
    wherein said rake mechanism comprises:
    a rake element with a plurality of said agitating fluid jets;
    a source of pressurized fluid;
    a central support attached to said rake element, said rake element and said central support forming a fluid passageway leading from said source of pressurized fluid to said plurality of agitating fluid jets in said rake element;
    a support member;
    support arms pivotally attached between said central support and said support member; and
    an actuator attached between said support member and said support arms.

2. An apparatus for dispersing objects within a liquid in a container and for agitating the objects while in the liquid, said apparatus comprising:
    (a) a container adapted to be at least partially filled with the liquid to thereby form a body of said liquid, said body having an upper surface;
    (b) a dispersal manifold containing at least one opening, said dispersal manifold being positioned within said container;
    (c) a carriage positioned above said upper surface for movement along said upper surface; and
    (d) an agitation manifold containing at least one opening, said agitation manifold being mounted on said carriage above said upper surface for back and forth movement over said upper surface.

3. Apparatus in accordance with claim 2 further comprising a pressurized supply of a fluid; wherein said dispersal manifold is operatively connected to said pressurized supply of a fluid; and wherein said agitation manifold is operatively connected to said pressurized supply of a fluid.

4. Apparatus in accordance with claim 3 further comprising a conduit for passing liquid from said container to said pressurized supply of a fluid such that the thus passed liquid is said fluid.

5. Apparatus in accordance with claim 4, wherein said objects are potato slices, wherein said container is a vessel for cooking potato slices in cooking oil, and wherein said pressurized supply of a fluid is a pressurized supply of cooking oil.

6. Apparatus in accordance with claim 2, further comprising:
(e) a conveyor to remove objects from the body of liquid in said container and from said container; and
(f) a sweep to sweep objects from the upper surface of the body of liquid in the container onto said conveyor, said sweep being attached to a frame mounted for movement relative to said container and to said conveyor.

7. Apparatus in accordance with claim 2 wherein each said opening in said dispersal manifold creates a fluid jet stream substantially parallel to the upper surface of the body of liquid in said container.

8. Apparatus in accordance with claim 2 wherein the axis of each said opening in said agitation manifold is substantially perpendicular to the upper surface of the body of liquid in the container.

9. Apparatus for dispersing potato slices being cooked in cooking oil, comprising:
(a) a kettle adapted to be at least partially filled with cooking oil to form a body of said cooking oil therein, said body having an upper surface, said kettle having an opening in the upper portion thereof;
(b) a pressurizable source for supplying cooking oil under pressure;
(c) a dispersal manifold mounted within said kettle and operatively connected to said pressurizable source of cooking oil for dispersing potato slices as they are introduced into said body of cooking oil;
(d) a rake mechanism mounted above said opening in the upper portion of said kettle, said rake mechanism having an agitation manifold operatively connected to said pressurizable source of cooking oil; and
(e) an actuator to move the rake mechanism back and forth over the upper surface of the body of cooking oil in said kettle.

10. Apparatus in accordance with claim 9 wherein said agitation manifold has a plurality of downwardly disposed openings; and wherein said rake mechanism further comprises:
a central support attached to said agitation manifold, said agitation manifold and said central support forming a fluid passageway leading from said presurized supply of cooking oil to said downwardly disposed openings;
an upright member movably mounted adjacent the opening in the upper portion of said kettle;
support arms pivotally attached between said central support and said upright member; and
an actuating cylinder attached between said upright member and said support arms.

11. Apparatus in accordance with claim 9 wherein said dispersal manifold comprises a structure with at least one opening dimensioned to produce a fluid jet stream in a plane which is generally parallel to the bottom of the kettle.

12. Apparatus in accordance with claim 9 further comprising:
a removal conveyor, said removal conveyor being mounted to extend through said opening in the upper portion of said kettle; and
a sweep to sweep cooked chips from the upper surface of the body of cooking oil in said kettle onto said removal conveyor.

13. Apparatus in accordance with claim 12 further comprising a dam positioned in said kettle to resist migration of chips to the removal conveyor.

14. Apparatus in accordance with claim 12 wherein said sweep comprises:
a hanging frame movably mounted in relation to said kettle;
a first horizontally segmented and hinged structure pivotally hung from said hanging frame;
a second horizontally segmented and hinged structure pivotally hung from said hanging frame, said second structure partially overlapping said first structure; and
an actuator to pull said sweep across the surface of cooking oil in the kettle.

15. Apparatus in accordance with claim 9 wherein said actuator to move the rake mechanism back and forth over the upper surface of the body of cooking oil in said kettle comprises:
a carriage mounted for movement relative to said opening in the upper portion of said kettle;
a chain attached to said carriage, said chain forming a circuit around a plurality of sprockets; and
a reversible motor to move said chain.

16. A rake mechanism for an automated kettle rake comprising:
(a) a rake element with a plurality of downwardly disposed openings;
(b) a source of pressurized fluid;
(c) a central support attached to said rake element, said rake element and said central support forming a fluid passageway leading from said source of pressurized fluid to the downwardly disposed openings in said rake element;
(d) a support member;
(e) support arms pivotally attached between said central support and said support member; and
(f) an actuator attached between said support member and said support arms.

17. An apparatus for dispersing objects and for agitating the objects while in a body of liquid in a container, the body of liquid having an upper surface, said apparatus comprising:
(a) at least one dispersal fluid jet to provide a dispersing fluid stream for causing motion of said objects, said at least one dispersal fluid jet being located in a dispersal manifold, said dispersal manifold being positionable with respect to said container so that said at least one dispersal fluid jet is covered by the liquid in the body of liquid in the container when said at least one dispersal fluid jet is in use, and wherein said dispersing fluid stream causes motion of the liquid in said container sufficient to move objects that have been introduced into the body of liquid away from the point of introduction of said objects into the body of liquid in the container; and
(b) at least one agitating fluid jet to direct at least one directed stream of an agitating fluid at the objects in the body of liquid in the container with sufficient force to agitate the objects within the body liquid in the container, said at least one agitating fluid jet being part of a rake mechanism, said rake mechanism being adapted for relative movement with respect to the upper surface of the body of liquid in said container;

wherein said objects are potato slices, wherein said body of liquid is cooking oil, wherein said container is a vessel for cooking potato slices in cooking oil, and wherein said rake mechanism comprises:

a rake element with a plurality of said agitating fluid jets;

a source of pressurized cooking oil;

a central support attached to said rake element, said rake element and said central support forming a fluid passageway leading from said source of pressurized cooking oil to said plurality of agitating fluid jets in said rake element;

a support member;

support arms pivotally attached between said central support and said support member; and an actuator attached between said support member and said support arms.

18. An apparatus for dispersing potato slices within a cooking oil in a container and for agitating the potato slices while in the cooking oil, said apparatus comprising:

(a) a container adapted to be at least partially filled with cooking oil to thereby form a body of cooking oil, said body having an upper surface;

(b) a dispersal manifold containing at least one opening, said dispersal manifold being positioned within said container;

(c) a carriage positioned above said upper surface for movement along said upper surface; and (d) an agitation manifold containing at least one opening, said agitation manifold being mounted on said carriage above said upper surface for back and forth movement over said upper surface.

19. Apparatus in accordance with claim 18, further comprising:

(e) a conveyor to remove the resulting cooked potato slices from the body of cooking oil in said container and from said container; and (f) a sweep to sweep said cooked potato slices from the upper surface of the body of cooking oil in the container onto said conveyor, said sweep being attached to a frame mounted for movement relative to said container and to said conveyor.

20. A rake mechanism for an automated kettle rake for cooking potato slices in cooking oil, comprising:

(a) a rake element with a plurality of downwardly disposed openings;

(b) a source of pressurized cooking oil;

(c) a central support attached to said rake element, said rake element and said central support forming a fluid passageway leading from said source of pressurized cooking oil to the downwardly disposed openings in said rake element;

(d) a support member;

(e) support arms pivotally attached between said central support and said support member; and (f) an actuator attached between said support member and said support arms.

* * * * *